April 17, 1973 G. A. BOWMAN 3,728,094
PROCESS OF MAKING GLASS
Filed July 15, 1971
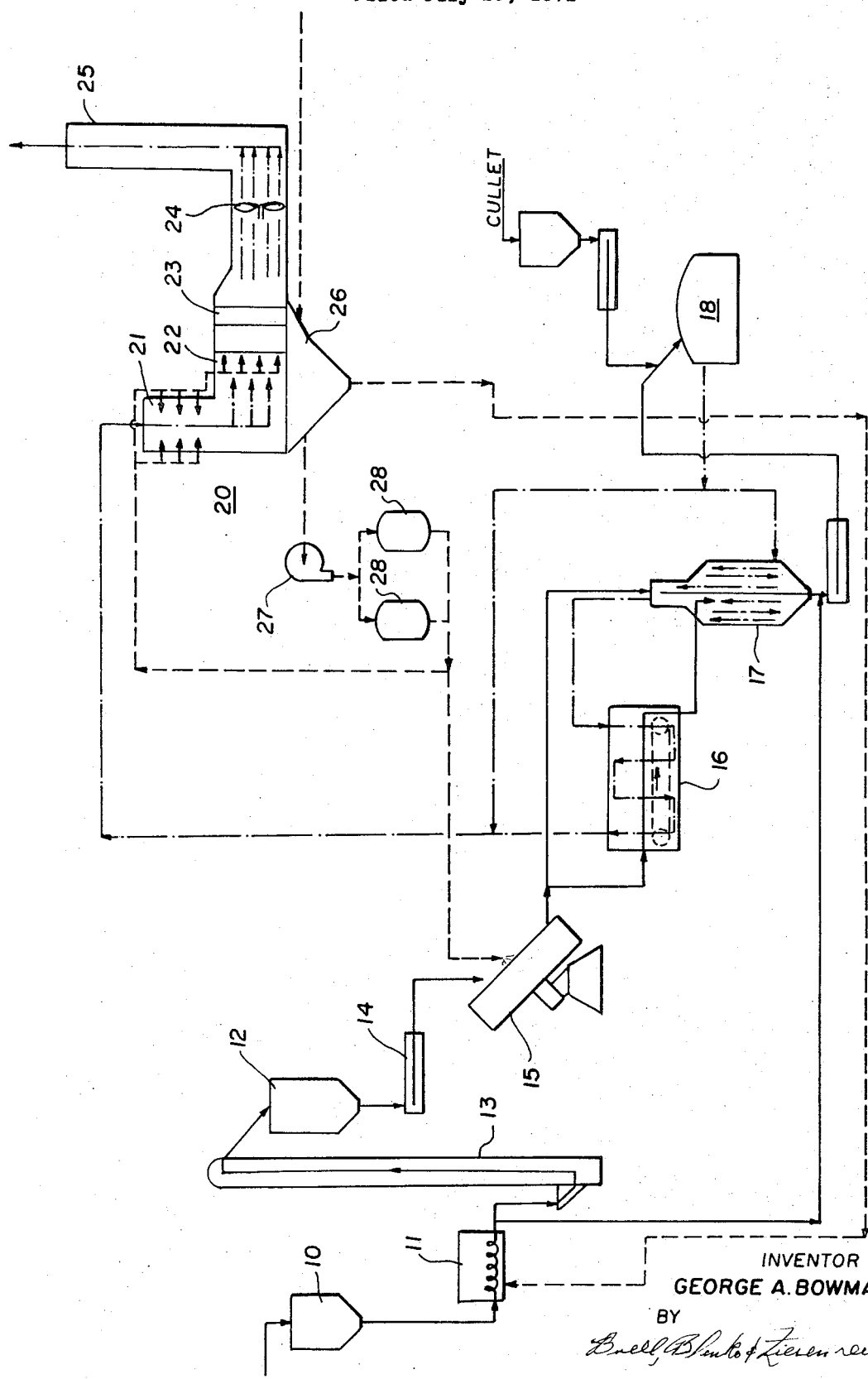
INVENTOR
GEORGE A. BOWMAN
BY
his ATTORNEYS United States Patent Office 3,728,094
Patented Apr. 17, 1973

3,728,094
PROCESS OF MAKING GLASS
George A. Bowman, Pittsburgh, Pa., assignor to
Bowman and Associates, Inc.
Filed July 15, 1971, Ser. No. 162,789
Int. Cl. C03b 5/16
U.S. Cl. 65—27                                   6 Claims

ABSTRACT OF THE DISCLOSURE

The specification discloses a process for making glass in which, by a combination of integrated steps, waste chemicals in the form of vapor or particulates now lost up the glass furnace stack to atmosphere are recovered and recycled into either agglomerated or unagglomerated glass batch. Also chemicals normally discharged to the sewer in a waste water stream are recovered and recycled into either agglomerated or unagglomerated glass batch. The process also enables recovery and recycling into the glass batch of a substantial percentage of the B.t.u. content of the fuel supplied to melt the glass batch in a standard furnace. The process enables compliance with most regulations regarding air and stream pollution.

---

This invention relates to a process of making glass and particularly to a process in which waste materials are recovered from the flue gases and used as a part of a feed for pelletized glass making materials while the waste heat is used to dry and preheat the agglomerated glass making materials entering the furnace.

In a typical glass making operation, the raw glass batch material, in the form of coarse powder, is stored in silos, bins or the like, from which it is removed, weighed and mixed. The materials used in the glass batch can include any or all of silica sand, sodium carbonate, sodium hydroxide, sodium sulfate, calcite, dolomitic limestone, burned calcite, burned dolomite, feldspar, fluorspar, barites, borax, chromite, nitre, small amounts of the salts of selenium, arsenic, iron and other materials.

These raw powdered materials after mixing are fed to a glass furnace at a controlled rate. In the furnace, the materials are heated to fusion and the glass flows from the furnace to the forming operation.

There are, of course, many types of glass, all of which may be made by the practice of this invention such as for example bottle, light bulb, table ware, electrical and electronic envelopes, plate and window glasses. They are of different composition and some are more exotic than others but all fall within the area of this invention.

The off gas is vented to the atmosphere through checkers or recuperators without any effort to remove chemical vapors or particulate material in the normal operation. The result is that there is discharged in and around the glass making plant a substantial amount of fine particulate material as well as chemical vapors which contaminate the area. This produces many problems beside the obvious ecological ones.

For example, these fine particle dusts rise in the intake of the furnace and become segregated resulting in delays in vitrification in the furnace and in lack of homogeneity of the product. These fine waste dusts also settle out in the refractory checker work and recuperators requiring periodic shut downs for cleaning. There are many other problems which arise from these conventional glass making processes.

There have been some attempts made to solve these problems but with only mediocre success. For example, it has been proposed to provide a constant moisture content mix of the powdered dust by adding a controlled amount of water. This does reduce the amount of dusting but it does affect the temperature of the furnace and unless carefully controlled damages the product by the formation of bubbles and unvitrified spots. Pelletizing of the feed materials has been proposed as described in Yamamoto Pat. 3,542,534 issued Nov. 24, 1970. This also reduces the amount of dusting in the intake throat of the furnace but does not eliminate the problem of chemical fume discharge or particulate waste discharge in the flue gases.

I have discovered a process of making glass which by a combination of integrated steps eliminates all of these problems. The practice of the process of my invention:

Provides for agglomeration of the glass batch by either pelletizing or briquetting;

Provides an economic savings by recovery and recycling into the glass batch of 10% to 20% of fuel value now required to melt standard glass batch in a standard furnace. The range of savings is between 700 to 1200 B.t.u.'s out of 6000 to 7000 B.t.u.'s total fuel consumption per ton of glass. To accomplish this savings, a stack furnace and compartmentilized dryer are used as more fully described hereafter;

Provides for recovery of chemicals both as vapor and particulates now lost up the stack in the discharge to the atmosphere, recycling these chemicals to either the agglomerated or unagglomerated glass batch, without losses to the environment;

Provides a clean exhaust gas discharge to atmosphere meeting most codes of the local air pollution regulatory authorities;

Provides an alternate combination means of drying agglomerated particles using the upper portion of the stack furnace, thereby eliminating heat loss in connecting ducts and the capital cost of a separate piece of equipment;

Provides a means of recovering and recycling chemicals into either the agglomerated or unagglomerated glass batch, which normally are discharged to the sewer in a waste water stream, thereby eliminating this source of pollution to the environment from industrial sewers;

Provides for the stopping of industrial chemical discharge to public sewers or waterways, thereby eliminating the need to obtain a regulatory permit for such waste flows that originate from batching and/or waste treatment clean up operations in connection with the waste gas stream; and Provides improvements in melting glass batch, compared to standard practice, including:

(a) lower temperature for furnace operation to produce the same tonnage output, resulting in fuel savings.
(b) for the same amount of fuel and operating temperature, melt a higher throughput of glass batch.
(c) provides a lower volume of dust and chemical carry over to the checkers for a given fuel usage.
(d) improved, more homogeneous glass is produced from melting heated uniformly mixed agglomerated particles.

In the practice of my invention I preferably mix the dry powdered materials in a mixer with blow down wash water slurry and convey the same to a holding bin from which the feed rate is accurately controlled as it passes to an agglomerating unit along with a liquid binder, from the agglomerating unit to a dryer and then to a stack furnace where the agglomerates are heated to elevated temperature and fed to the glass furnace. Preferably the agglomerating unit is a pelletizer or briquetting machine. The liquid binder is preferably water containing dissolved chemicals recovered from the stack gases and moist precipitate from the stack gases. The agglomerate dryer is preferably operated from the waste gas flow from the furnace as is also the stack furnace. The waste gases after leaving the dryer are wet scrubbed to remove all particulate matter is fed to the agglomerating unit where it ticulate matter and soluble chemicals. The recovered paris combined with the dry mix and with concentrated dissolved recovered chemicals such as sodium sulfate in the wash water for the waste gas scrubber.

In the foregoing general description I have set out certain objects, purposes and advantages of my invention. Other objects, purposes and advantages of this invention will be apparent from a consideration of the following description and the accompanying drawing which shows diagrammatically the process of my invention.

Referring to the drawing, I have illustrated a batching bin 10 delivering powdered raw materials to a mixer 11 which thoroughly mixes the powdered raw materials and delivers them to a holding bin 12 by means of elevator 13. The mix is then fed using an accurate weigh feeder 14 to an agglomerating unit such as the disc pelletizer 15 where water is added. The pelletized particles may be of any size or shape that fits the batch mixer and equipment used.

The agglomerated particles are fed to a gas dryer 16 which may be any conventional type, preferably compartmentalized, normally waste gas heated unit, wherein the agglomerated particle is placed on moving belts to a depth of at least 4". The actual bed depth will depend on the residence time in the dryer, temperature of input hot gas, the temperature desired for the exhaust gas and the pressure drop that can be tolerated across the sectionalized moving beds. Gas flow is preferably directed up and down through the bed as it enters different compartments. The gas flow is counter-flow to the movement of the agglomerated particles on the belt. The hot gases normally will be the waste flow from glass furnaces which have been passed through another higher temperature waste heat exchanger stack furnace 17. The stack furnace 17 receives the dried agglomerates from the dryer 16 where they come in contact with the hotter gases from the glass melting furnace. Here more heat is absorbed in the agglomerated particle, increasing the temperature of the particle and cooling the waste gas. The transfer of heat depends on the B.t.u. content and temperature of the incoming gas, residence time of gas and particles in contact with each other, specific heat and temperature of the incoming particle. The flow of the particles is vertically downward, counter current to the upward flow of waste gas.

Under some conditions of operations, the compartmentilized dryer may be by-passed or eliminated. In this event, the top portion in the stack of the stack furnace is used as the dryer for incoming agglomerated particles. Care must be taken to make certain that moist particles are not dried too rapidly, which would cause steam to form inside the particle. Cracking would follow as the pressure relieves itself. After severe cracking, particles may tend to disintegrate before melting as they move through the remainder of the process. In addition cracked smaller chips from originally larger particles will fill voids between agglomerates thereby increasing the pressure drop in the gas flow.

From the stack furnace 17 the heated pellets are weighed or measured and conveyed to the glass melting furnace 18 at a selected rate. The cullet is also carefully weighed and fed at a controlled rate to the glass furnace at this point in the process. The temperature of the heated particle of agglomerated glass batch as it enters the glass furnace should be from 100° to 200° F. below the temperature of the hot gas exiting from the glass melting furnace. The preheated particles of glass batch feed are now heated to reaction temperature and vitrification takes place forming glass.

The waste gases normally leave the checkers of the glass melting furnace at about 1000° to 1200° F. As they proceed upward through the stack furnace 17 heat is transferred to the particles coming down the stack. The gas leaves the stack furnace and enters the dryer 16 if one is used. In the dryer, the gas passes through the bed of particles on the compartmentalized belt and heat is absorbed by the particles from the gas. The gas normally leaves the dryer at a temperature of between 200 to 300° F.

The gas leaving dryer 16 is conducted to a wet scrubbing system 20 consisting of a wet quenching elbow 21, scrubber 22, moisture eliminator or separator 23, fan 24 and motor, chimney stack 25, thickner 26, pumps 27 and water filters 28. In the wet elbow 21, the hot gases are quenched to adiabatic saturation. The scrubber will be selected to remove vapors, and all particulate matter to meet the codes of regulatory authorities at the plant site. The water flow through the scrubber is collected in a thickner 26 located under the scrubber. The moisture separator 23 removes condensation as droplets, also collecting them in the thickner 27. The fan 24 provides suction for transfer of exhaust gases from the glass melting furnace through the stack furnace, insulated ducts, dryer, wet elbow, scrubber, moisture separator and out the chimney stack to atmosphere. The pressure drop across the fan will vary between 15" to 50" water gauge depending on the system designed and especially the type of scrubber selected.

Sodium sulfate is one of the most prevalent chemicals in the waste gas stream. This chemical leaves the glass furnace as a vapor. When the gas stream temperature cools to about 400° F. the sodium sulfate begins to condense out of the gas stream as very fine solid particles. As part of this invention, some of these fine chemical particles adhere to the agglomerated briquette or pellet, thereby causing the chemicals to be removed from the gas stream and remaining in the bed of agglomerated particles. The remainder of the chemicals are carried into the scrubber 20 where they are wetted by the sprays, nozzles or other wetting procedures by which the selected scrubber operates. Here the chemicals are dissolved by the scrubbing solution. As the solution is recycled through the scrubber, it becomes more and more concentrated as the soluble chemicals dissolve. Sodium sulfate, one of the most prevalent chemicals is very soluble, and readily dissolves into the water solution. The scrubber also removes non-dissolving chemicals as solids at this point. Thus, substantially all of the polluting chemicals are removed from the waste gas stream going to the atmosphere.

As part of this invention, a thickner 26 is placed under the scrubber. It acts as a gravity receiver of the chemical solution and non-dissolved suspended solids coming out of the scrubber as a slurry. This latter class of materials consists of such things as silica sand, lime cores, insoluble or slow dissolving sulfates. By properly sizing the thickner with regards to flow and temperature, clarified water rises to a weir at the top and solids settle to the bottom. The solids on the bottom are removed as blowdown. The blowdown solids slurry will be piped back to the batch mixer where water is desirable for improved mixing procedures. In this manner, the chemicals in the blowdown from the thickner are restored to the batch and are recycled through the glass making process. There is no loss or pollution to the environment.

The overflow of clarified water, from the thickner 26, containing dissolved chemicals is piped through filters 28 to sprays 31 at the pelletizer or briquetting machine. Here the water and chemicals absorbed in the batch. In this manner, the chemicals dissolved in the water solution are restored to the batch and are recycled through the glass making process, without loss or pollution to the environment.

The overflow from the thickner 26 consisting of settled water is filtered to remove any particles remaining in this clarified water flow. While any of several types of filters may be used, the preferred type is one containing deep sand beds which is insensitive to thickner upsets caused by variation in water temperature. Therefore, filters are used containing deep sand beds. They filter in vertical cross section of the filter bed, and use air to loosen and scour the solids from the carefully sized relatively large sand grain media. The air scour takes place simultaneously with an upward backwash rinse flow which carries the solids up and out of the filter tank. As part of this invention, the loosened solids, having been agglomerated in the filter is piped to the thickener inlet where it now settles to the thickener bottom and is removed with the other solids in blowdown. It is recycled to the mixer, combining here with the glass batch. Here, too, there is no leakage or loss to the environment. Filtrate from the filters 28 is used on the pelletizer disc sprays or on the nozzles in certain types of scrubbers. Clean filtrate will help give trouble free nozzle spray operation.

As part of this invention, in the event it is desired only to recycle chemicals collected in the scrubber water and not recover heat, the water from the thickner containing these chemicals in the blowdown is piped to the mixer. In this manner, the solids collected from the gas stream by the scrubber are recycled to the glass batch. If this partial installation is made, non-agglomerated batch may continue to be fed to glass making furnace as is now normally done. However, a conventional cooling tower is required to reject the heat accumulated in the scrubber water circuit as it is picked up from the hot waste gas exhaust stream.

While I have illustrated and described certain presently preferred practices of my invention in the foregoing specification, it will be understood that this invention may be otherwise embodied within the scope of the following claims.

I claim:
1. A process for making glass comprising the steps of:
    (a) mixing powdered raw glass making materials;
    (b) adding to said mixture as a liquid binder an aqueous slurry of waste products recovered from scrubbing the waste flue gas from a glass furnace;
    (c) agglomerating said mixture into larger formed agglomerates;
    (d) drying said agglomerates; and
    (e) feeding the dried agglomerates to said glass furnace as the raw feed for glass making.

2. The process as claimed in claim 1 wherein the agglomerates are dried and heated by the waste flue gases from said glass furnace.

3. The process as claimed in claim 2 wherein the waste flue gases from the drying and heating step are passed to a wet scrubber where water is sprayed therethrough to remove particulate solid matter and soluble chemicals and the resulting solid matter and soluble chemicals returned to the mixture prior to agglomeration.

4. The process as claimed in claim 1 wherein the mixture is agglomerated on a rotating disc pelletized into pellets.

5. The process as claimed in claim 1 wherein the agglomerates are dried in a compartmentalized waste gas dryer and delivered to a stack furnace and heated by waste gases from said glass furnace.

6. The process as claimed in claim 1 wherein the mixture is formed into briquettes.

References Cited
UNITED STATES PATENTS

| | | | |
|---|---|---|---|
| 3,542,534 | 11/1970 | Yamamoto | 65—27 |
| 3,647,405 | 3/1972 | Smith | 65—19 |
| 3,607,190 | 9/1971 | Penberthy | 65—27 |

ARTHUR D. KELLOGG, Primary Examiner

U.S. Cl. X.R.

55—Dig. 41; 65—19, 157, 335